(12) United States Patent
Mayer et al.

(10) Patent No.: US 7,929,208 B2
(45) Date of Patent: Apr. 19, 2011

(54) COMPLEX POLARIZER SYSTEM FOR RECIPROCAL POLARIZATION (CROSS-POLARIZER)

(76) Inventors: Max Mayer, Forchheim (DE); Bernhard Rudolf Bausenwein, Hagelstadt (DE)

( * ) Notice: Subject to any disclaimer, the term of this patent is extended or adjusted under 35 U.S.C. 154(b) by 500 days.

(21) Appl. No.: 10/587,850

(22) PCT Filed: Feb. 2, 2005

(86) PCT No.: PCT/DE2005/000194
§ 371 (c)(1),
(2), (4) Date: Jul. 28, 2006

(87) PCT Pub. No.: WO2005/076635
PCT Pub. Date: Aug. 18, 2005

(65) Prior Publication Data
US 2007/0159693 A1    Jul. 12, 2007

(30) Foreign Application Priority Data
Feb. 4, 2004    (DE) .......................... 10 2004 006 148

(51) Int. Cl.
*G02B 5/30*    (2006.01)
(52) U.S. Cl. ................. 359/485.03; 353/20; 359/485.05; 359/485.06
(58) Field of Classification Search .................... None
See application file for complete search history.

(56) References Cited

U.S. PATENT DOCUMENTS

| | | | |
|---|---|---|---|
| 2,449,287 A * | 9/1948 | Flood | 359/487 |
| 5,028,121 A | 7/1991 | Baur et al. | |
| 5,798,819 A | 8/1998 | Hattori et al. | |
| 5,921,650 A | 7/1999 | Doany et al. | |
| 6,280,034 B1 | 8/2001 | Brennesholz | |
| 6,309,071 B1 * | 10/2001 | Huang et al. | 353/31 |
| 6,377,318 B1 * | 4/2002 | Menard | 348/745 |
| 6,391,528 B1 | 5/2002 | Moshrefzadeh et al. | |
| 6,476,972 B2 * | 11/2002 | Edlinger et al. | 359/634 |
| 6,490,087 B1 * | 12/2002 | Fulkerson et al. | 359/487 |
| 6,530,663 B2 * | 3/2003 | Lin | 353/33 |
| 2001/0040670 A1 | 11/2001 | Fielding | |
| 2003/0020809 A1 | 1/2003 | Gibbon et al. | |
| 2003/0072079 A1 | 4/2003 | Silverstein et al. | |
| 2003/0117708 A1 | 6/2003 | Kane et al. | |
| 2003/0128320 A1 * | 7/2003 | Mi et al. | 349/117 |
| 2004/0120041 A1 | 6/2004 | Silverstein et al. | |

* cited by examiner

*Primary Examiner* — Stephone B Allen
*Assistant Examiner* — Derek S Chapel

(57) ABSTRACT

A complex polarizer system ("cross-polarizer") including an arrangement of at least three polarizing beam splitting layers P1,P2,P3. P1 and P2 are arranged such that a beam transmitted by P1 is reflected by P2 without further polarization rotating components; P3 is arranged such that a beam reflected by P1 transmits P3 without further polarization rotating components. The congeneric processing of the two sub-beams of a beam split at P1 (both sub-beams go through a transmission and a reflection) eliminates the intrinsic asymmetries of simple polarizers with respect to purity and folding. Coupling of cross-polarizers results in efficient arrangements of systems which operate with complementarily polarized radiation, e.g. 2-channel image display systems with reflective spatial light modulators (e.g. Liquid Crystal on Silicon displays).

24 Claims, 14 Drawing Sheets

Fig.6E $\dfrac{0.885 \times 0.880}{0.003 \times 0.050} = 5000$

COMPLEX POLARIZER SYSTEM FOR RECIPROCAL POLARIZATION (CROSS-POLARIZER)

BACKGROUND OF THE INVENTION

The invention relates to optic systems in the visible and near-visible electromagnetic spectrum, which comprise a polarizer. More specifically, the invention relates to complex, that are compound polarizers made of several polarizing layers. The invention uncovers the most simple arrangement of cross-polarization, in which each sub-beam of a split or a combine process goes through both a transmission and a reflection at a polarizing layer. Cross-polarization is achieved by the arrangement of 3 polarizing layers without additional optical elements.

DISCUSSION OF THE STATE OF THE ART

A short survey on simple polarizers (in contrast to complex, compound polarizing systems) is provided in patent application DE102004006148, the content of which is part of this application. In this publication the significance of our invention for 2-channel display systems is explained. Therefore, we present here a short overview on the state of the art of polarizing systems used in such display systems.

In 1990, Lee (DE4040081) described a layout for transmissive liquid crystal displays (LCD), in which a polarizing beam splitter (PBS) was used to split an incident unmodulated light beam and a second PBS was employed to superimpose the two polarized beams after their modulation by the imagers.

For reflective LCDs Baur et al, (U.S. Pat. No. 5,028,121) already in 1988 uncovered an architecture that includes only one PBS. This single PBS is used for both separation of the polarized beams (splitter function) and the superposition (as well as polarization recombination) of the two modulated beams. A similar polarizer arrangement is found in Gibbon et al. (2001, US20030020809) and is also described in Svardal et al. in 2001 (WO03058342) for the use with LCoS (Liquid Crystal on Silicon) Displays (FIG. 1A). A somewhat similar engine, but with a split/recombination system for several color channels was described by Hattori and Oikawa in 1996 (U.S. Pat. No. 5,798,819).

For use with Digital Mirror Devices (DMDs) Fielding (US20010040670) shows a light architecture with only a single PBS for beam splitting and superposition. Solutions for a 2-channel DMD system, which take into account that there is currently only one topological form of the (stereo isomeric) DMD were uncovered by Bausenwein and Mayer in 2003 (DE10361915). This architecture uses two PBSs, one for beam splitting and a second for superposition.

All engines, which use a single PBS for the superposition (FIG. 1A) inherit the intrinsic properties of the PBS: transmissive and reflective paths differ in several aspects (we call this a functional "asymmetry"): polarization contrast (dichroic ratio) and intensities of the two sub-beams resulting from a split of a natural light beam are different. There is also a geometric asymmetry in that only one beam the "S"-polarized beam, is folded by the reflection. Because "S"-polarized light is virtually not transmitted, the transmitting "P"-polarized beam is "contaminated" with only 0,1% "S"-polarized light, which leads to a polarization contrast $r_{dichro}$ of 1000:1; whereas the reflected "S"-beam (FIG. 1A, dotted line) contains a approximately 5% "P"-polarized light ($r_{dichro}$=20:1). A polarization contrast as low as that is especially problematic for the use of LCoS imagers. These LCoS displays modulate an incident polarized beam by reflecting bright image pixels with a rotated polarization plane (ON-beams) and reflecting dark pixels without a change of polarization (OFF-beams), FIG. 1A). The "S"-beam, incident on RLM1 (spatial light modulator) contains a contamination of 5% P-polarized light (not shown). This "P"-polarized light is, at dark pixels, reflected with its incident polarization, and thus gains access to and contaminates the ON-beam of RLM1, since it has the same polarization as the modulated light reflected from bright pixels by RLM1. The transmitted "P"-light incident on RLM2 contains less polarization impurity. However, this "P"-light, reflected at dark pixels by RLM2 as "P"-light, will then partially (5%) be reflected by PBS P1 into the ON-beam of RLM2. Therefore, both channels are similarly subjects to the imperfect polarization function of the PBS (channel 1 at the incident beam when the beam is split, channel 2 at the output beam, when the images are superimposed), leading to a low image contrast of only about 20:1 for both channels.

As a consequence, for 2-channel display systems with LCoS displays, various architectures with complex, multiple polarizers (see FIG. 1B) have been disclosed Doany and Rosenbluth in U.S. Pat. No. 5,921,650, Brennesholz in U.S. Pat. No. 6,280,034, Roth in WO03007074, O'Donnell et al. in EP1337117). The architectures of these topologically similar solutions is shown in FIG. 1B. In all cases the polarizer is composed of 4 PBSs, the arrangement is such that the thin-film layers of the PBSs form a compound "X". Additionally, the light guidance is similar: An input PBS splits the incident beam into a reflected "S"-polarized beam and a transmitting "P"-polarized beam. The "S"-polarized beam, folded at P1, is then folded back by P3 into a direction parallel to the direction of incidence and onto a LCoS display (RLM1). The "P"-polarized beam, which transmits P1, also transmits P2 and is incident onto the second LCoS display (RLM2). The "S"-polarized input beam, which is folded twice, will be modulated by RLM1 to a "P"-polarized ON-beam and leave the system straight after transmitting both P3 and P4. The "P"-polarized input beam, twice transmitting before reaching RLM2, will be modulated to a "S"-polarized ON-beam and leave the system after two reflections at P2 and P4, together with the "P"-beam. This complex polarizer is a significant improvement compared to the single PBS. The advantage is realized by the combination of several polarization processes, in which the contaminations are successively reduced (mathematically described by a multiplication of the dichroic ratios resulting from simple polarizations). However, even in this arrangement of 4 PBSs there should be additional cleanup polarizers, to reduce or remove the "P"-polarized polarized light in the "S-"light upstream and downstream of the modulators. These contaminations are a disadvantage of the coupling of identical polarizations (S-S, P-P) in the two channels.

In contrast to the architectures described above in our application (PCT/DE2005/000194) we have developed the cross-polarizer. Nothing but the proper arrangement of polarizing layers causes that both sub-beams in the polarizer go both through both a transmissive, and a reflective polarization process. We call transmission and reflection in the PBS "complementary" processes, and also refer to "S"- and "P-polarization states as being complementary, since they complement each other to natural light. Natural unpolarized light split by our invention leads to two polarized sub-beams which have the same polarization contrast, the same intensity, and which both are reflected once. We call this a functionally "symmetrical" beam split (or "symmetrical" beam recombination). We have also used the term reciprocal to denote that in one beam the transmission precedes the reflection while in the second beam the reflection precedes the transmission. We also introduce complex cross-polarizers, which consist of several simple cross-polarizers. They render possible very efficient architectures of systems employing two complementarily polarized light beams (e.g. 2-channel display systems with spatial light modulators).

DETAILED DESCRIPTION OF THE INVENTION

1. Mode of operation of the polarizers used and introduction of designators.

Polarizing layers of the beam splitter type split an unpolarized light beam in two linearly polarized light beams by a polarizing transmission and a polarizing reflection (FIG. 2). The plane of polarization (POP) of the light which is reflected (POPref) from and, respectively, the plane of polarization of light which transmits the polarizing layer (POPtrans) can be deduced from the optic axis of incidence (A1), the optic axis of the reflection (A2) and a vector (V1), which is coplanar with the polarization layer P1. V1 and the axis of incidence A1 span the plane E1. E1 is perpendicular to the plane of polarization E2 of the transmitting beam (POPtrans). V1 and the axis of reflection A2 span the plane E3, which is the plane of polarization of the reflected beam (POPref).

We have introduced the vector described above and termed it "polarizing layer vector" of a polarizing beam splitter. It is defined such that it can be used both for the thin-film polarizer (FIG. 2A, e.g. MacNeille type) and for a cartesian polarizing beam splitter (FIG. 2B, wire grid polarizer, e.g. Proflux™ from Moxtek).

In thin-film polarizers, which operate according to Brewster's law, the plane of incidence (POI) directly determines the plane of polarization (POP) of the transmitted and the reflected light: the transmitted light ("P"-polarized) has a POP parallel to POI (E2 in FIG. 2A), the reflected light ("S"-polarized) has a POP perpendicular to POI (E3 in FIG. 2A). Accordingly, it is possible to determine a layer vector V in thin film polarizers (V1 in FIG. 2A), which is always perpendicular to POI (in these polarizers, POP and POI are strictly coupled).

Cartesian polarizers make it possible to uncouple POP from POI (FIG. 2B). The polarizing layer vector V of a cartesian polarizer is determined by properties of the polarizing layer itself (e.g. in wire grid polarizers the orientation of the wires in the polarizing layer, compare V1 of P1 in FIG. 2B). Polarizing layer vectors, and accordingly the POPs, can be chosen independently from POI.

Single polarizing beam splitters of both types, thin-film and cartesian, have in common the different polarization contrast for the two sub-beams. While the transmitted beam is rather clean and is contaminated with less than 1/1000, the reflected beam contains about 5% of the opposite polarization.

2. The cross-polarizer: reciprocal polarization at polarization layers, which act complementary.

A central aspect of our invention is the multiple coupling of a polarizing transmission at one polarizer with a polarizing reflection at a second polarizer, which we therefore call to act "complementary" to the former.

Three polarizing layers P1, P2 and P3 with their polarizing layer vectors V1, V2 and V3 along two optical axes A1 and A2 are structurally coupled such (FIG. 3) that P1 and P2 and also P1 and P3 act as complementary polarizing layers. This is achieved when the plane E1 (plane in German is "Ebene", and we stick to the E in the translation because we do not want to confuse polarizers with planes), spanned by A1 and V1, is perpendicular to plane E2, spanned by A1 and V2, and moreover plane E3, spanned by A2 and V1, is perpendicular to plane E4, spanned by A2 and V3. The perpendicular crossing of the functional planes E1 and E2, and that of E3 and E4, led us to the term "cross-polarizer".

This has the functional consequence that a polarizing transmission process along A1 at P1 can be coupled with a polarizing reflection process at P2 (FIG. 4A) and a polarizing transmission process along A1 at P2 can be coupled with a polarizing reflection process at P1 (FIG. 4B). Moreover, a polarizing transmission process along A2 at P1 can be coupled with a polarizing reflection process at P3, and a polarizing transmission process along A2 at P3 can be coupled with a polarizing reflection process at P1 (not shown, compare FIG. 4).

If one chooses, like in our invention, the direction of the optical axes such that these are identical to the corresponding transmission and reflection axes of a possible polarization process at P1, the resulting setup can be used for our principle of reciprocal polarization (FIG. 3). Mathematically described, this is achieved when the angle between the normal vector N1 of P1 and the optical axis A1 is equal to the angle between the normal vector N1 of P1 and the optical axis A2.

In our invention of reciprocal polarization at complementary polarizing layers 4 polarization processes are coupled: two complementary polarizations in the first optic path (a transmission at P1 is coupled with a reflection at P2) are coupled with two complementary polarizations in the second optic path (the reflection at P1 is coupled to with a transmission at P3). We call this coupling of the two couplings reciprocal polarization, because transmission and reflection happen in opposite succession in both beams. We would like to add here already that the described three-armed cross-polarizer (FIG. 3) can be expanded to a cross-shaped layout (stippled line in FIG. 3) by the addition of a fourth polarizing layer.

3. The three-armed cross-polarizer (first and second embodiments of the invention)

FIG. 5A shows a first embodiment of the three-armed cross-polarizer, assembled with three wire grid polarizers (WGP), in which the direction of the polarizing layer vectors (grid orientation) is not perpendicular to POI, and where the angles between POP and POI are neither equal to 0 nor to 90 degrees. An unpolarized light beam incident on P1 is split into two linearly polarized light beams, both of which run through an additional polarization process, which is complementary to the first process. The beam transmitting P1 goes through a polarizing reflection in P2, and the beam reflected at P1 transmits P3. As has been mentioned above, with cartesian polarizers it is possible to uncouple the plane of polarization from the plane of incidence. As a consequence, the POPs of the two sub-beams, which are generated in the beamsplitter P1 by reflection and transmission, have polarization planes which are not orthogonal towards each other (as long as V1 is neither parallel nor perpendicular to POI). As a reference system for POP (or the e-vector) of a beam we use a cartesian coordinate system xyz with the coordinates z, denoting the direction of the beam, x, being perpendicular to z and parallel to POI, and y being perpendicular both to z and POI. Only after each of the beams is folded once (e.g. after the beam transmitting P1 is folded at P2 as a consequence of reflection), both beams are, in their relative coordinate systems, "ortho-polarized" (the angle between their POPs being 90 degrees).

A second embodiment, as an important special case of the first embodiment, is shown in FIG. 5B. Polarizing layer vectors are chosen such that V1 is perpendicular to POI and V2 and V3 are parallel to POI. The opposite relation, with V1 being parallel to POI and V2 and V3 being perpendicular to POI, is also feasible. This results in a cross-polarizer made of only two physical polarizing layers (one of them with two polarization "hotspots"). P1 now works in a rather similar way to a thin-film polarizing beam splitter (e.g. MacNeille type), if the angle of incidence is chosen to be 45 degrees to the normal of the polarizing layer. In this situation, the POP of the reflected beam is perpendicular to POI and the POP of the transmitting beam is parallel to POI. According to the state of the art for thin-film beam splitters, the beams could be designated as "S" and "P" (S=Senkrecht, german for perpendicular, and P=parallel) polarized beams.

4. Polarization contrast in the cross-polarizer

The polarization contrast resulting in a cross-polarizer is shown in FIG. 6. The complementary processes are quantitatively described. Beam splitting with a cross-polarizer leads to equally high polarization contrasts for both sub-beams. The following evaluation uses data of the Proflux™ WGP from Moxtek. The linearly polarized "P" light beam transmitting P1 (transmission coefficient tc =0.885) will be maximally reflected by P2 (reflection coefficient rc=0.88) (FIG. 6A). The "S" polarized beam transmits P1 minimally (tc=0.003) and is minimally reflected by P2 (rc=0.05) (FIG. 6B). All data is taken from "Kahn: Doing it with stripes, Private Report on Projection Display, V7, No. 10, 2001, www.profluxpolarizer.com". The complementary situation is shown in FIGS. 6C,D. A beam incident on one of the polarizers has in the transmitted beam a relatively high polarization contrast of 0.885/0.003=295:1. The reflected beam has a comparatively small contrast of 0.88/0.05≈18:1. However, after the second polarization in the cross-polarizer, both beams have a equally high polarization contrast due to the coupling of a polarizing transmission and a polarizing reflection (295* 18=18*295>5000:1).

5. The four-armed cross-polarizer third and fourth embodiments of the invention)

To set up a four-armed cross-polarizer the three-armed cross-polarizers shown in FIGS. 5 are supplemented by a fourth polarization layer (FIG. 7) such that P4 forms with P2 along a third optical axis A3, and with P3 along a fourth optical axis A4, an additional three-armed cross-polarizer (comp. FIG. 3). The cross-like structure of polarizing layers contains 4 quadrants, which are in the following designated as south, north, west and east quadrants. FIG. 7A shows a cross-polarizer in a third embodiment of our invention where the polarizing layer vectors (and thus the resulting POPs) are uncoupled from POI.

FIG. 7B shows a fourth embodiment of the disclosure, a four-armed cross-polarizer with polarizing layer vectors parallel and perpendicular to POI. In this arrangement, it is possible to couple multiple cross-polarizers. In contrast to the third embodiment, where the cross-polarizers P1,P2,P3 (optical path is a continuous line) and P3,P4,P1 (optical path is a stippled line) send light with a different polarization direction in the two halves of the west quadrant, in the fourth embodiment both input cross-polarizers send "P"-polarized light into the west quadrant, and "S"-polarized light into the east quadrant (FIG. 7B). Analogous to the three-armed cross-polarizer shown in FIG. 5B, P2 and P3 have the same polarizing layer vector, additionally also P1 and P4 have a common polarizing layer vector. Therefore, the layers may have contact in the center of the arrangement or even may be realized as continuous layers. As a consequence, in this four-armed cross-polarizer (fourth embodiment) with polarizing layer vectors parallel and perpendicular to POI it is possible to feed both P1 and P3. We have designated this arrangement the "closed" form of the four-armed cross-polarizer, in contrast to the embodiment shown in FIG. 7A, which we call the "open" form of the four-armed cross-polarizer.

An important detail of the closed form (FIG. 7B) is the central crossing line. Its physical size depends, beside imprecisions in the actual manufacturing process, also on the thickness of the cartesian polarizing layer. In the WGP made by Moxtek, it is less than 0.2 µm thick. The closed form of FIG. 7B (comp. also FIG. 8B) illustrates the temporal commutative law for successive transmission and reflection in the cross-polarizer: light of a certain polarization direction incident on P1 (one half of the south quadrant) will first transmit P1 and then be reflected at P2, light with the same polarization direction incident on P3 (other half of the south quadrant) will first be reflected at P3 and then transmit P1. Despite the different temporal order of these polarizing processes, both output beams sent in the two halves of the output quadrants (east, west) are of identical intensity and of the same polarization contrast. This is caused by the multiplicative interaction of reflection and transmission coefficients. The doubling of the incident beam width allows one to reduce the cross-polarizer footprint by a factor of 4 to only 25% of the footprint of the third embodiment (compare FIGS. 8A,B).

6. Cross-polarizing principle in 2-channel display systems including polarization-rotating reflective spatial light modulators (fifth and sixth embodiment)

The addition of a fourth polarizer to a three-armed cross-polarizer has far-reaching consequences for its use. FIG. 8 shows in a fifth and sixth embodiment of our disclosure the assignment of the four-armed cross-polarizer in the open (FIG. 8A) and closed (FIG. 8B) form for a two-channel display system. The optical path shows a two-channel display system with two reflective spatial light modulators (e.g. polarization rotating modulators of the type LCoS) interact with the cross-polarizer, in which the polarizing layer vectors are parallel and perpendicular to POI.

In the open form (FIG. 8A) unpolarized light is incident in one half of the south quadrant (IN). "P"-polarized light, transmitting P1, is reflected at P2 and fed onto the spatial light modulator RLM1, which occupies one half of the west quadrant. "S"-polarized light, reflected at P1, transmits P3 and is fed onto RLM2, which occupies one half of the east quadrant (cross-polarizer P1,P2,P3). At dark, unmodulated light pixels (OFF) the image modulators reflect the light back, along the paths of incidence, without changing its polarization. At bright pixels (ON) the modulators will rotate the polarization of the incident beams to the complementary polarization ("S"-IN becomes "P"-ON, and "P"-IN becomes "S"-ON). For the superposition of these ON-beams into one of the halves of the output quadrant (north) the second cross-polarizer (P4,P2,P3) is used. This open form can also be used with polarizing layer vectors different from 0 degrees or 90 degrees, therefore any polarization direction is feasible.

In the closed form (FIG. 8B) it makes sense to feed both P1 and P3. Now, two three-armed cross-polarizers (P1,P2,P3) and (P3,P1,P4) will split the unpolarized incident light and feed "P"-polarized into the entire west quadrant and "S"-polarized light into the entire east quadrant. While the unmodulated OFF-beams will be reflected back to the input quadrant (south), the polarization-modulated ON beams will be superposed by two further cross-polarizers (P4,P2,P3) and (P2,P1,P4) and exit the arrangement via the north quadrant. This arrangement for image modulators is such effectively shrunk. The closed form will occupy only a quarter or less than the open form. This allows one to design very compact light architectures (minimum size of the cross-polarizer is a quadratic area with a side length of RLM width).

Especially in this sixth embodiment with polarization-rotating reflective spatial light modulators the symmetrically acting principle of the cross-polarizer both for the beam split and for the superposition is very obvious. Both sub-beams, derived by the polarizing beam split, leave the cross-polarizer symmetrically into opposite directions, along the east-west axis. The same principle applies for the superposition, in which ON- and OFF-beams for both channels leave the cross-polarizer symmetrically in opposite directions along the north-south axis (FIG. 8).

7. Cross-polarizing systems and types of polarizers used

All embodiments above are realized by using wire grid polarizers. In most examples shown, the polarizing layers are perpendicular to a common ground plane (the normal vectors of the layer planes being coplanar). The light guidance in all systems above is realized only by polarization beam splitters within the cross-polarizer. In the following we uncover that none of these restrictions is necessary for the cross-polarization principle. Other arrangements and other types of polarizers are compatible with cross-polarizing systems.

If additional reflective means M (e.g. mirrors) are inserted between two polarizing layers (FIG. 9), the optical axis (e.g. A1) is transformed into an optical path S1. In this case, both axis A1 and the plane E1, defined by polarizing layer vector V1 and A1 are transformed by folding or foldings along the path of S1 into a folded plane E1* and a folded axis A1*. Cross-polarization results if the folded plane E1* is perpendicular to the plane E2, spanned by V2 and the folded axis A1* (shown as S1 through P2 in FIG. 9). In FIG. 9, the POIs of the mirrors are chosen such that they are either parallel or perpendicular to the POPs of the folded beams. This preferred POI of the mirror is, however, not required. Other POIs may be used, however might result with elliptically polarized reflected light. In that case, additional polarization corrections with wave-plates could be included in the systems (e.g. full wave plates).

In our application DE102004006148 we have indicated that WGPs with certain polarizing layer vectors can be replaced by polarization beam splitters of the MacNeille type (e.g. P1 in FIG. 9). This will be illustrated in more detail in the following embodiment.

8. The four-armed cross-polarizer made of 4 thin-film type polarizers with polarization rotating reflective spatial light modulators (seventh embodiment of the invention)

The cross-polarizer in this embodiment (FIG. 10) consists of 4 PBSs of the MacNeille type, arranged in two planes with two mirrors or total internal reflection prisms. Input and output PBSs have the same polarizing layer vectors; these two PBSs are situated directly above each other and could be made of a single physical PBS. Polarizing layer vectors of polarizers P2 and P3 are perpendicular to that of P1/P4, so that the cross-polarizing principle is fulfilled. This layout has, caused by the high channel separation and very low absorption of this PBS, theoretically an even higher channel separation than a cross-polarizer made of WGPs (0.0001 polarization impurities in the transmitting beam and 0.05 in the reflected beam, 0.95 transmission coefficient, 0.998 reflection coefficient, yielding a theoretical channel separation of (0.95*0.998)/(0.0001*0.05)>180.000:1, compared to 5000:1, data taken from data sheet for PBS, Newport Oriel Instruments, Irvine, USA). Moreover, the light efficiency is enhanced from approx. 60% $(0.885*0.88)^2$ to approx. 90% $(0.95*0.998)^2$. As shown in FIG. 8A, this open form of the four-armed cross-polarizer can be used with polarization-rotating reflective spatial light modulators. The same arrangement is also possible with WGP (not shown).

9. The cross-polarizer in 2-channel display systems with image modulators of the type Micro-Electro-Mechanical-Systems (MEMS)

MEMS modulate the incident light not by a change (rotation) of polarization, but by a change of the direction of the reflected light. MEMS according to the state of the art consist of an array of electronically deflectable mirrors, which reflect the ON-beams in the direction of the normal to the modulator surface (Digital Mirror Devices, DMD by Texas Instruments).

DMD modulators, according to the state of the art, show stereo-isomeric characteristics (of which only one form is recently produced). Since a single polarizer folds only one sub-beam at superposition, it is preferable to use either an isomeric pair of modulators or to apply an additional folding to one channel prior to superposition to obtain the virtually stereoisomeric form (Bausenwein and Mayer, DE10361915). The cross-polarizer, in contrast, folds both channels—and thus allows one to use only a single DMD type (e.g. the currently available stereo-isomer) without additional means of reflection (in FIG. 11, a closed cross-polarizer is shown). The incident beam reaches the DMD surface under an angle of 24 degrees. This corresponds to the double deflection angle of the micro mirrors of the recent DMD. The mirrors reflect the light at bright pixels (ON-beam) into the normal of the DMD surface. These ON-beams are superposed in a plane which is parallel to the ground plane of the cross-polarizer. Light at dark pixels will be reflected under an angle of 48 to the normal (twice the incidence angle) opposite to the incident light towards a light dump (not shown). Incidence (IN) and the output of the system (ON) in this embodiment take place in the south quadrant. In an open form according to FIG. 5 a three-armed cross-polarizer is sufficient for the system. If there are additional quarter wave-plates ($\lambda/4$) between cross-polarizer and modulators, the ON light will be guided to the north quadrant (not shown).

10. The two-armed form of the cross-polarizer (ninth embodiment of the invention)

The three-armed cross-polarizer can, under certain conditions, be meaningfully reduced to a two-armed cross-polarizer (FIG. 12A). This can be achieved by guiding a sub-beam, derived by a polarizing transmission of P1, in the optical path S1, by a mirror M onto the polarizer P2 in a way that this polarizer reflects this sub-beam. Additionally, the other sub-beam, derived from a polarizing reflection at P1, is guided in the optical path S2 onto P2, optionally by another mirror (M) in a way that this sub-beam transmits P2.

The two-armed cross-polarizer can be used for arbitrary complementary polarization directions. However, there is a significant difference to all three-armed and four-armed cross-polarizers: the sub-beams cannot be tapped outside the involved PBSs: the sub-beams in S1 and S2 only exist between the two complementary polarization processes. This embodiment can be used for example in 2-channel display systems with MEMS type image modulators, which are then located on S1 and S2 between P1 and P2 (not shown). Since MEMSs do not modulate the light via a change of polarization, the polarization impurities still contained after one simple polarization do not interfere with modulation and will be largely removed at superposition. This leads in the two-armed cross-polarizer with MEMSs to the same high channel separation of >5000:1 as in three-armed cross-polarizers. Crosstalk between the channels is then less than 0.0002. Like in the other embodiments, the two modulated sub-beams, superposed in the common ON-beam, can again be split by an external analyzer, e.g. passive polarization glasses.

11. Cross-polarizers with glass prisms

The open two-, three- and four-armed cross-polarizers are easily built from single, discrete polarizers. More intricate is the production of the closed form, since the quality and dimensioning of the central crossing line gets important. In DE102004006148 we have introduced prisms, from which the closed form of the cross-polarizer can be built with cartesian polarizers. We have also shown that cartesian polarizers with a certain, specified V can be replaced by MacNeille type PBSs. FIG. 13A shows such a MacNeille type PBS, the polarizing layer of which is positioned between two right prisms. The resulting prism is (FIG. 13A) is completed with a wire grid polarizer to yield a three-armed cross-polarizer, with a polarizing layer vector of the WGPs chosen such that the WGPs acts complementary to the PBS. As an alternative to the thin-film polarizer P1 there could also be a WGP between T1 and T2 (FIGS. 13B,C). For some applications, it is useful to add a prism without polarizing function (FIGS. 13A-C). The closed form of the four-armed cross-polarizer can be built in multiple ways, e.g with two prisms as shown in FIGS. 13A-F (an example is FIG. 13I) or with four prisms as shown in FIG. 13E and FIG. 13F (as is shown in FIG. 13H). Also, a prism as shown in FIG. 13A can be supplemented by a triangular thin-film polarizer (FIG. 13G). Those known to the art or science can deduce many more possibilities. Some of the resulting arrangements may contain a double WGP layer with parallel polarizing layer vectors (FIGS. 13H,I). Alternatively two-sided WGPs (as described by Kameno and Yoshiki in EP1158319, or Silverstein et al. in US20030072079 or and US20040120041, can be applied at any layer. For the application of the wire grid layers onto the substrates, e.g. glass, several techniques have been described. In addition to the already mentioned WGP of Moxtek we exemplarily refer to alternative methods, e.g., from Kodak (e.g. EP1239308, EP1411377). Beside WGP, other cartesian polarizers may also be involved, e.g. such as described by 3M (U.S. Pat. No. 6,391,528, Moshrefzadeh and Thomas).

12. Cross-polarizers concluded with a body

In FIG. 14 we show a four-armed cross-polarizer, which is concluded by a body. This makes it possible to fill gases or fluids in the body, resulting either with a desirable change of refraction properties or, when inert gases are used as filling material, with a reduction of undesired corrosion effects of the wires (e.g. Kane and Kus in US20030117708). FIG. 14A shows the open, FIG. 14B the closed form each contained in a body. In the north quadrant a projection optic may be integrated. This may help to accomplish a very compact architecture.

BRIEF DESCRIPTION OF THE SEVERAL VIEWS OF THE DRAWING

FIG. 6E shows the polarization contrast resulting from the single coefficients of FIGS. 6A-D in the cross-polarizer.

DETAILED DESCRIPTION OF THE FIGS.

Figures 1A, 1B:
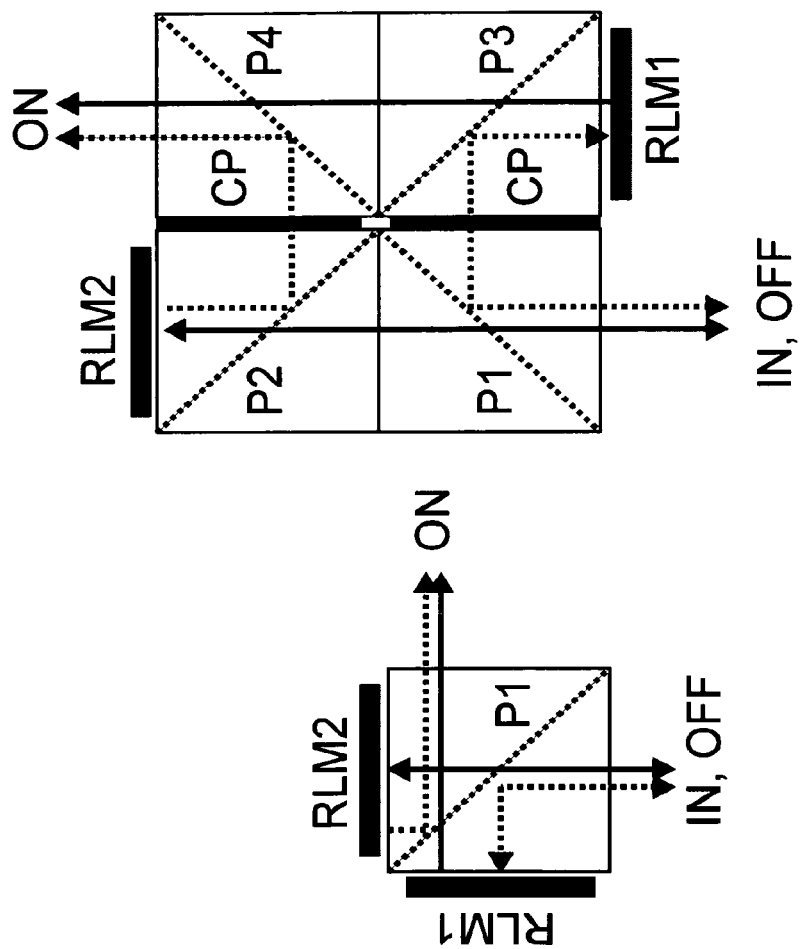
FIG. 1A (prior art) schematically shows a light engine for a 2-channel LCoS-driven display using a simple polarizer.
FIG. 1B (prior art) schematically shows a light engine for a 2-channel LCoS-driven display using a complex polarizer made of 4 PBSs and 2 cleanup polarizers.

FIG. 1(A,B) shows a simple and a complex polarizer in 2-channel display systems with polarization rotating reflective spatial light modulators (RLM, e.g. LCoS displays) according to the state of the art. FIG. 1A shows a design with a single PBS. Incident unpolarized light (IN) is split by the polarizer P1 in two linearly polarized sub-beams. "S"-polarized light (dotted line) is directed to RLM1 by polarizing reflection. "P"-polarized light (solid line) is directed to RLM2 by polarizing transmission. Light beams incident on the RLM at dark pixels (OFF) are reflected without a change of their polarization back to the axis of incidence. Light beams incident on the RLM at bright pixels are reflected after a rotation of their plane of polarization ("S"-polarized light is rotated to "P"-polarized light and vice versa), and as a consequence these reflected beams are superposed into a common ON-axis. FIG. 1B shows a complex polarizer with four identical MacNeille type polarizers P1 to P4. Unpolarized incident light (IN) is split by P1 into two polarized sub-beams. The reflected sub-beam from P1 ("S"-polarization, dotted line) is also reflected at P3 and is incident on RLM1. The transmitted sub-beam of P1 ("P"-polarization, solid line) also transmits P2 and is incident on RLM2. Beams incident on RLM at dark pixels remain unchanged in their polarization and are so reflected back to the axis of incidence (OFF). In contrast, the POPs of beams incident on RLM at bright pixels are rotated by the modulator. They are superposed into a common ON beam (incident light that transmitted P1 and P2 is now reflected at P2 and P4; incident light that was reflected at P1 and P3 now transmits P3 an P4). Additional clean-up (CP) polarizers are placed between P1/P3 and P2/P4. These clean-ups reduce polarization impurities in the reflected light beams, they make no contribution to the light path.

Figure 2A:
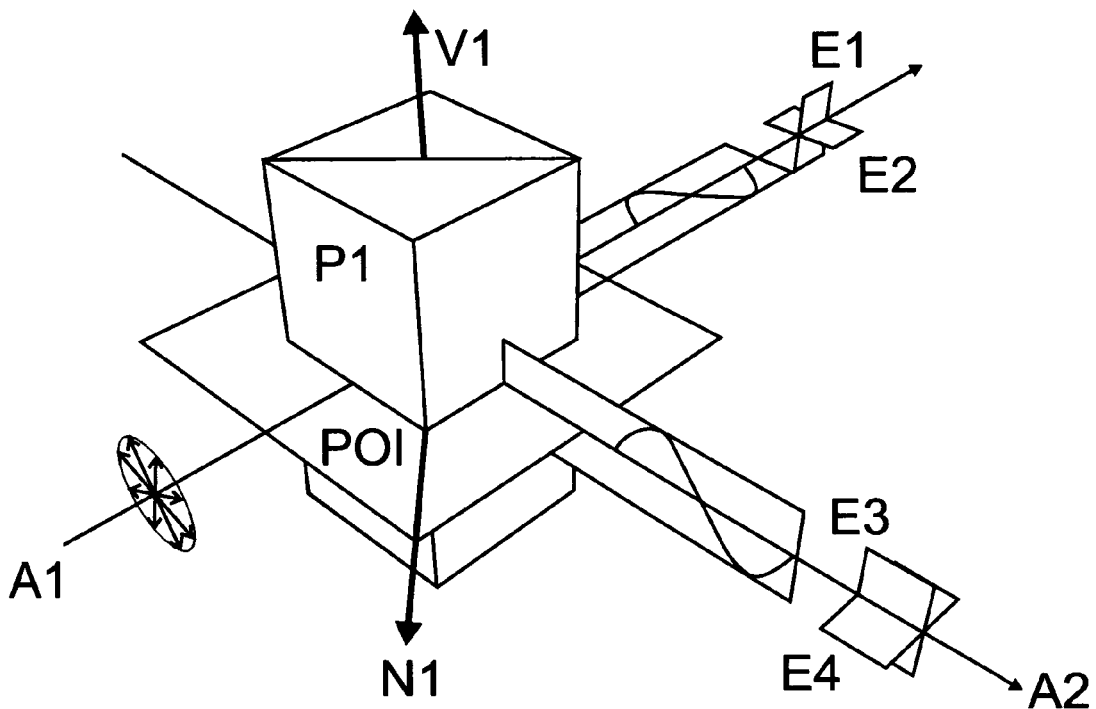
FIG. 2A shows the polarizing layer vector V in a MacNeille type PBS.
Figure 2B:
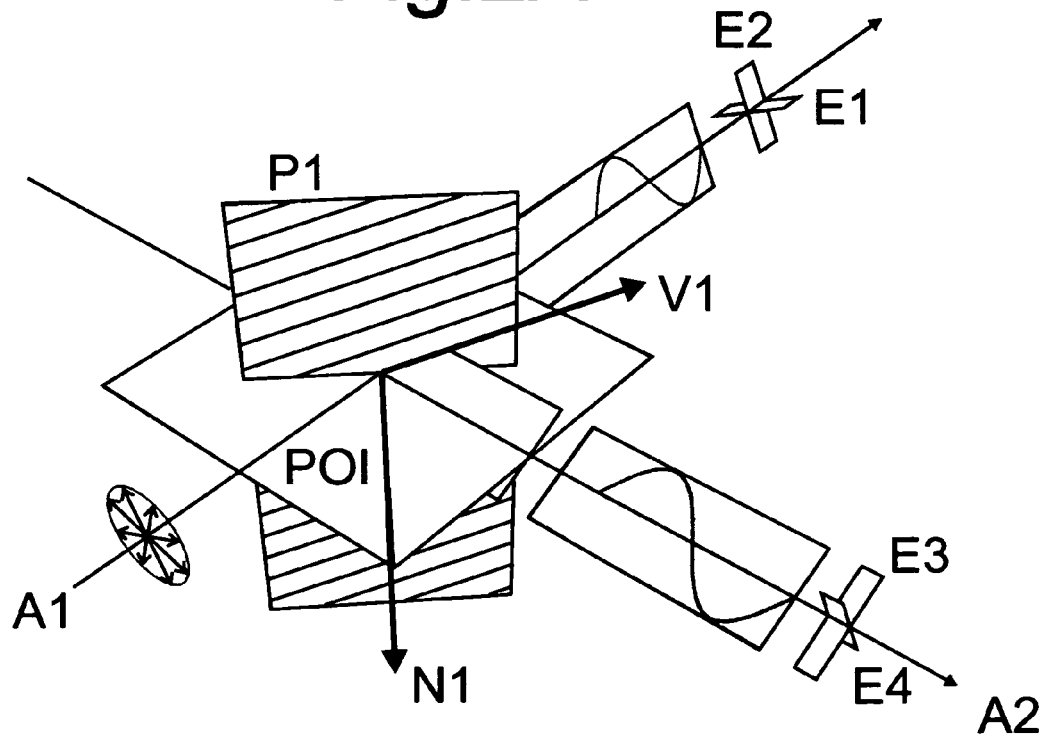
FIG. 2B shows the polarizing layer vector V in a cartesian PBS (e.g. a wire grid polarizer).

FIG. 2 shows the operational principle of polarizing beam splitters and a definition of polarizing layer vector V and normal vector N. Thin-film polarizers like the MacNeille-PBS (P1 in FIG. 2A) polarize an unpolarized beam into two linearly polarized sub-beams. Their planes of polarization E2 and E3 are coupled in such a way to the plane of incidence (POI) that the sub-beam derived from a polarizing transmission along the optical axis A1 has a POP parallel to POI ("P"-polarization, E2) and the sub-beam created by a polarizing reflection along the optical axis A2 has a POP perpendicular to the POI (E3). A1 is perpendicular to A2 and each axis has an angle of 45 degree with the normal vector N1. The polarizing layer vector V1, perpendicular to POI, and A2 define the POP E3 of the reflected sub-beam; the polarizing layer vector V1 and A1 define a plane E1 perpendicular to the POP E2 of the transmitted sub-beam.

While in MacNeille-type PBS V1 is always normal to the POI (FIG. 2A), in so-called cartesian polarizers (e.g. the wire grid polarizer WGP P1 shown in FIG. 2B), the POI can be chosen independently from V1. V1 corresponds to the WGP grid orientation and together with A2 defines the POP E3 of the reflected sub-beam; V1 and A1 define a plane E1 perpendicular to the POP E2 of the transmitted sub-beam. Each POP of the two sub-beams can (in contrast to the Brewster polarizer of FIG. 2A) have an angle with POI of P1 different from 0 or 90 degrees.

Figure 3:
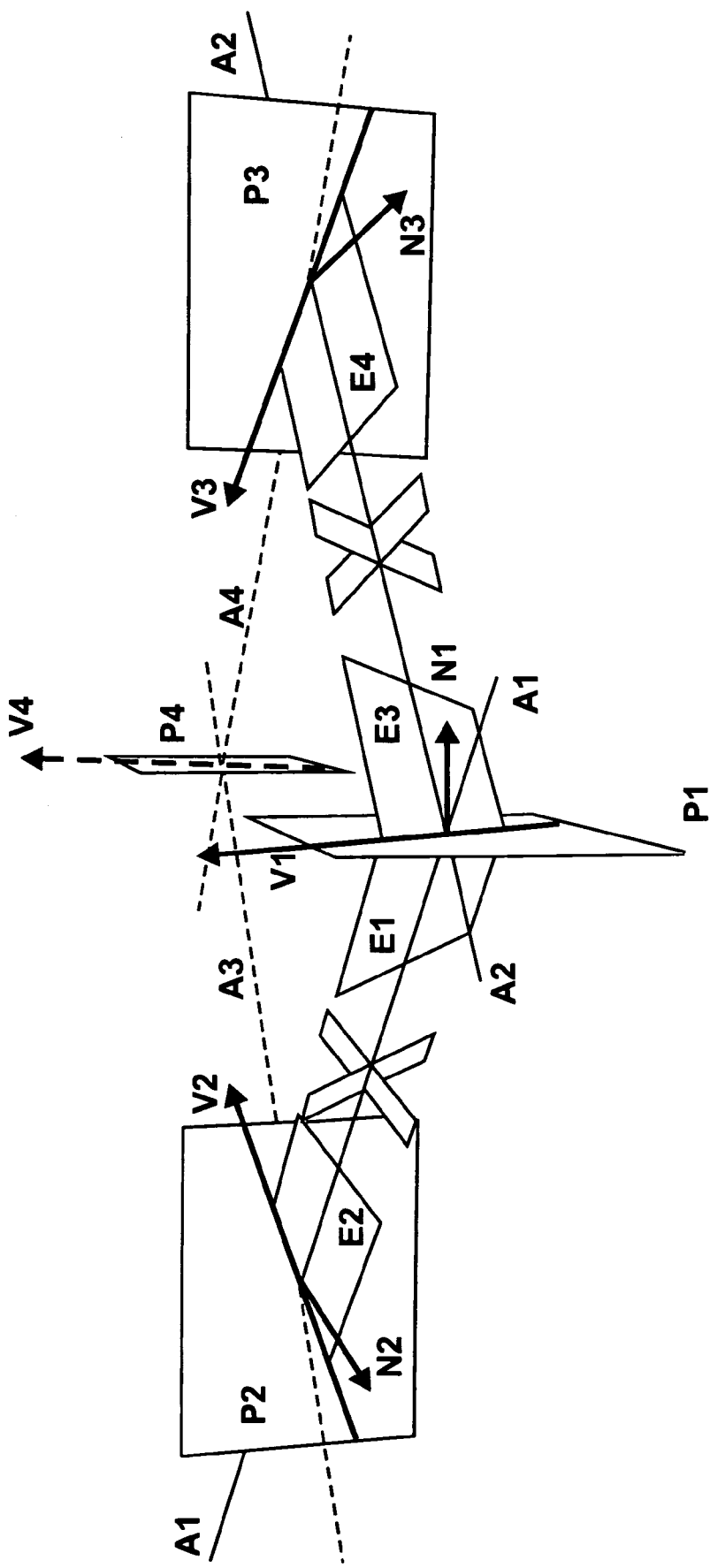
FIG. 3 shows the vectors and planes necessary to describe the cross-polarizer.

FIG. 3 shows structural characteristics of the cross-polarizer: three polarizers P1, P2, P3 with the polarizing layer vectors V1, V2, V3 and the normal vectors N1, N2, N3 normal to the respective polarizing layer are arranged along two optical axes A1, A2 V1 of P1 and the axis A1 define a plane E1, Axis A2, which is defined by A1 being reflected in P1, and V1 define the plane E3. P2 is arranged such that V2 and A1 span a plane E2, which is perpendicular to the plane E1. P3 is arranged such that V3 and A2 define a plane E4 which is perpendicular to E3. This three-armed cross-polarizer can be extended to a four-armed cross-polarizer using a fourth polarizer P4 with a polarizing layer vector V4 and a normal vector N4 along two further optical axes A3 and A4 resulting in four three-armed cross-polarizers (P1,P2,P3), (P4,P2,P3), (P2,P1,P4), (P3,P4,P1).

Figure 4A:
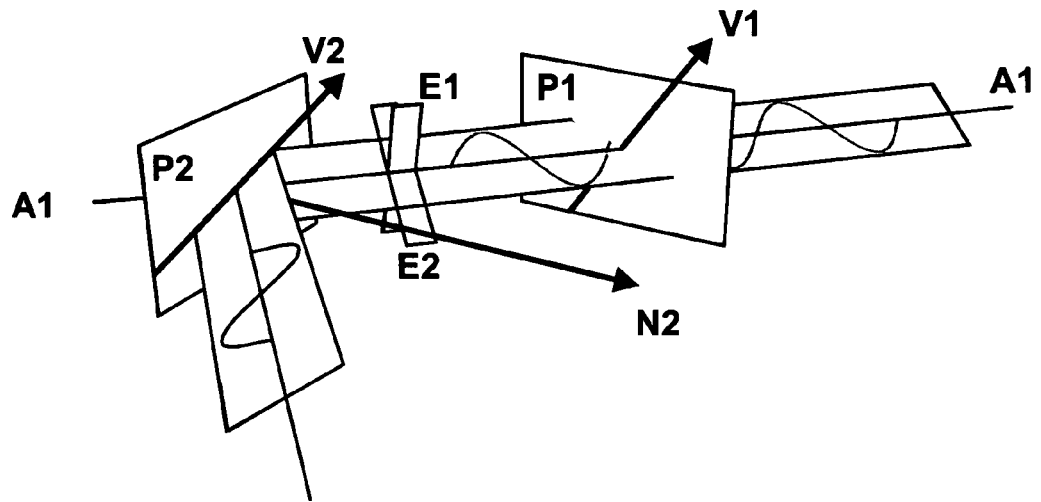
FIG. 4A shows an arrangement of two polarizing layers which are arranged to couple a reflection and a transmission of a beam with the indicated POP.
Figure 4B:
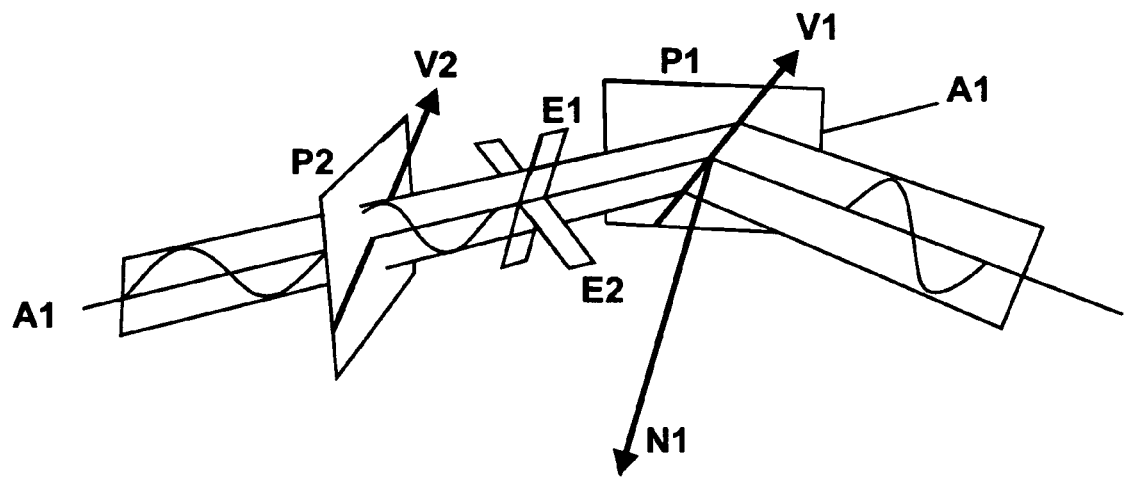
FIG. 4B shows the same layers as in FIG. 4A achieve to couple the complementary polarization processes of a beam with a complementary POP.

FIGS. 4A,B show functional characteristics of the cross-polarizer: the coupling of a polarizing transmission with a polarizing reflection at two polarizing beam splitting layers, which act complementary on a beam with a given plane of polarization. We call P1 complementary to P2 if they are arranged along an optical axis A1 such that a linearly polarized light beam along axis A1, which transmits P1, is reflected at P2 and vice versa. If V1 and A1 span a plane E1, and if V2 and A1 span the plane E2, and if E1 is perpendicular to E2 as has been shown in FIG. 3, a beam with a POP E2 will transmit V1 and be reflected at P2 with maximum efficiency (FIG. 4A). Another beam with a POP E1 will transmit P2 and be reflected at P1 with maximum efficiency (FIG. 4B).

Figure 5A:
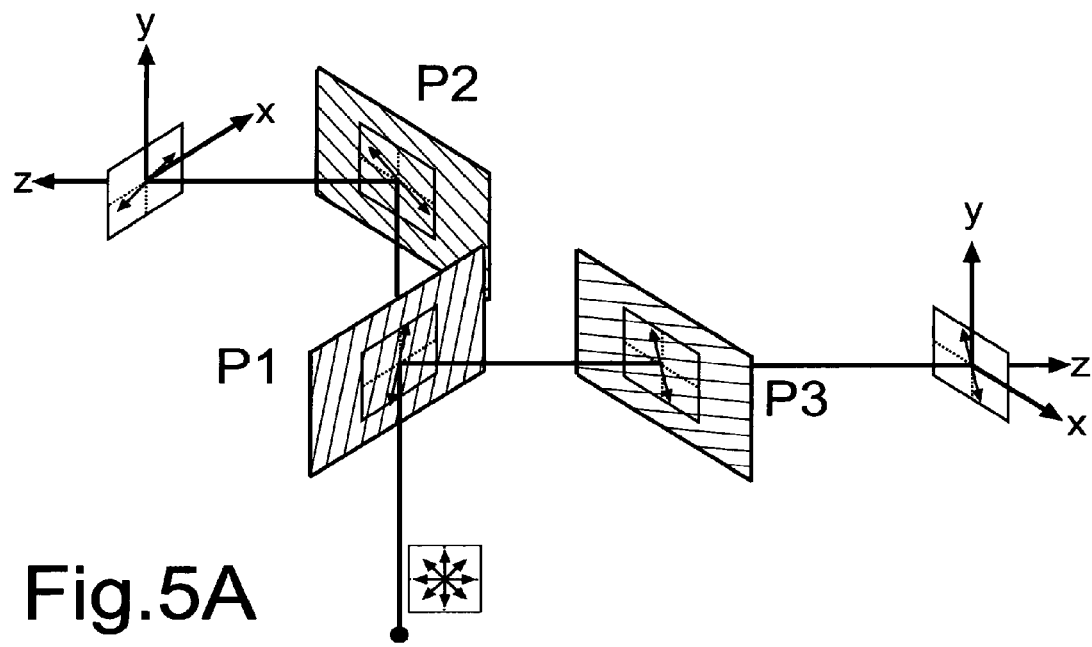
FIG. 5A schematically shows a first embodiment of the cross-polarizer.
Figure 5B:
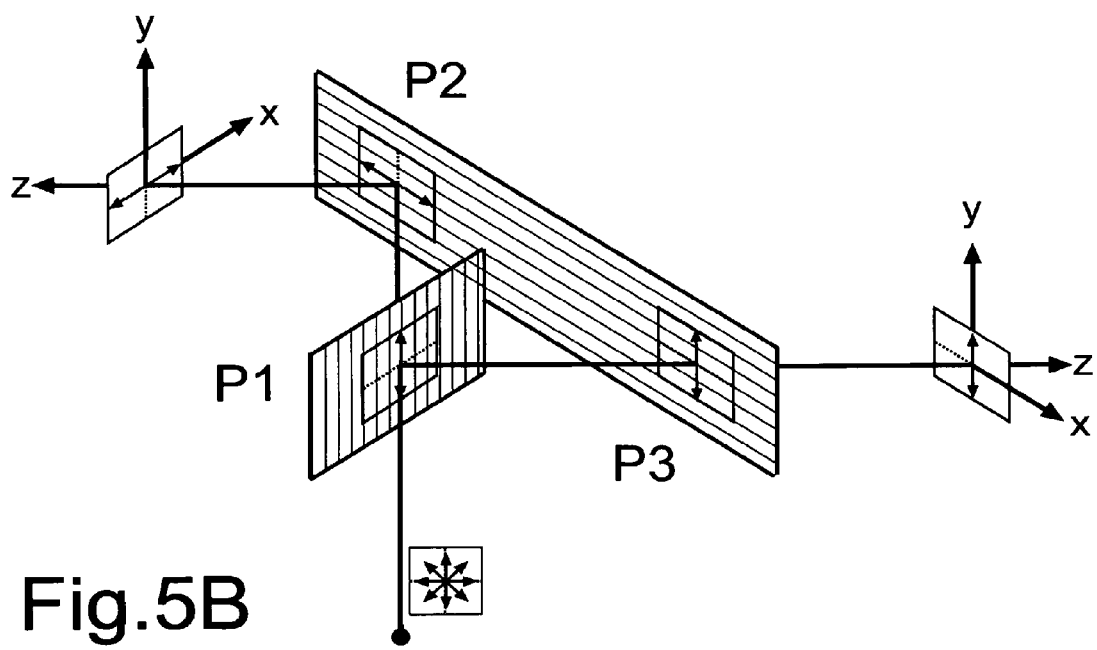
FIG. 5B schematically shows a second embodiment of the cross-polarizer.
Figure 6A:
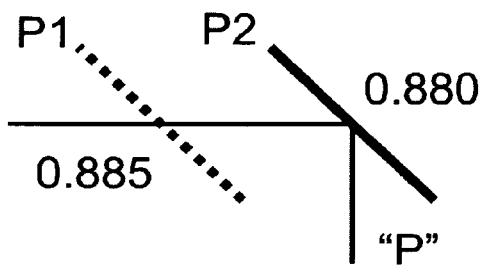
FIG. 6A shows coefficients for "P"-transmission at P1 and the coupled "P"-reflection at P2 in the cross-polarizer (data for ProFlux polarizers).
Figure 6B:
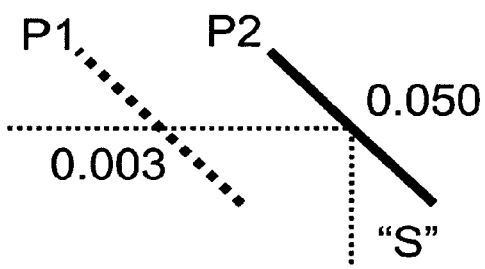
FIG. 6B shows coefficients for "S"-transmission at P1 and the "S"-reflection at P2 in the cross-polarizer (data for ProFlux polarizers).
Figure 6C:
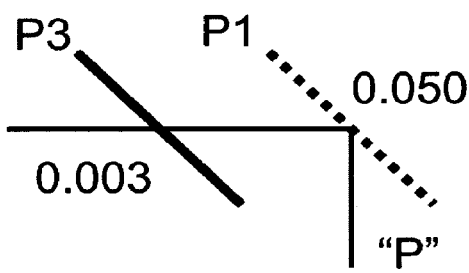
FIG. 6C shows coefficients for "P"-reflection at P1 and "P"-transmission at P3 in the cross-polarizer (data for ProFlux polarizers).
Figure 6D:
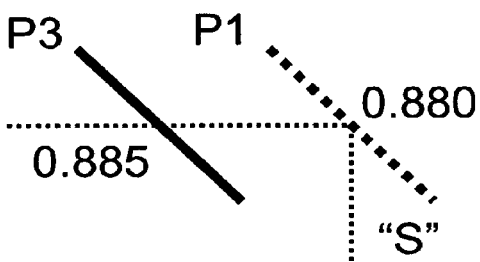
FIG. 6D shows coefficients for "S"-reflection at P1 and the coupled "S"-transmission at P3 in the cross-polarizer (data for ProFlux polarizers).

FIG. 5A shows a three-armed cross-polarizer in a first embodiment of our invention. Three polarizing layers P1, P2, P3 are arranged with their normal vectors coplanar (not shown). The polarizing layer vectors of the polarizing layers correspond to the wire grid axes and are aligned such that the structural and functional characteristics outlined in FIGS. 3 and 4 are given provided. We show the split of an unpolarized incident light beam into two linear polarized sub-beams of different polarization. The sub-beam transmitting P1 is reflected at P2 (the arrow at P2 indicates the cutting line of the plane of polarization (POP) of this beam and P2). The sub-beam reflected at P1 transmits P3 (the arrow at P3 indicates the cutting line of the POP of this beam and P3). After each sub-beam is subjected to a polarizing transmission and a polarizing reflection they are complementarily linearly polarized (which means that their POPs are perpendicular if they are defined by a x-y-z-reference system given by the direction of the beam z, the vector x coplanar to the POI and perpendicular to z and the vector y perpendicular to POI and perpendicular to z). FIG. 5B shows in a second embodiment the polarizing layer vector P1 being perpendicular to the POI and the polarizing layer vectors of P2 and P3 being parallel to the POI. In this variation of the first embodiment a single polarization layer comprises both P2 and P3.

FIG. 6 shows how the equally high polarization contrast of 5000:1 in both channels of the cross-polarizer originates when wire grid polarizers WGPs are used (data of WGP beam splitters taken from Kahn: Doing it with stripes, Private Report on Projection Displays, V7, NO.10, 2001, www.prof-luxpolarizer.com). Polarization layer P1 with a polarizing layer vector perpendicular to POI (and, correspondingly perpendicular to the drawing plane) is shown as dotted line. The polarization layers P2 and P3 which are complementary to P1 (their polarizing layer vectors are in the drawing plane) are shown as solid line. "P"-polarized light (solid thin line) with a polarization vector in the drawing plane maximally transmits P1 (0.885) and is maximally reflected by P2 (0.880, FIG. 6A). The complementary "S"-polarized light (dotted thin line) in contrast minimally transmits P1 (0.003) and is minimally reflected by P2 (0.050, FIG. 6B). We can calculate a polarization contrast: an incident unpolarized light beam (combining FIGS. 6A and 6B) contains after transmitting P1 and reflection at P2 "P"-polarized light (0.885×0.880) and "S"-polarized light (0.003×0.050) in a P/S ratio of 5000:1 (FIG. 6E). FIG. 6C and FIG. 6D show the complementary situation for the second sub-beam. Here, "S"-polarized light maximally transmits P3 and is maximally reflected by P1 (FIG. 6D), while the complementary "P"-polarized light minimally transmits P3 and is minimally reflected by P1 (FIG. 6C), resulting in a S/P ratio of again 5000:1.

Figure 7A:
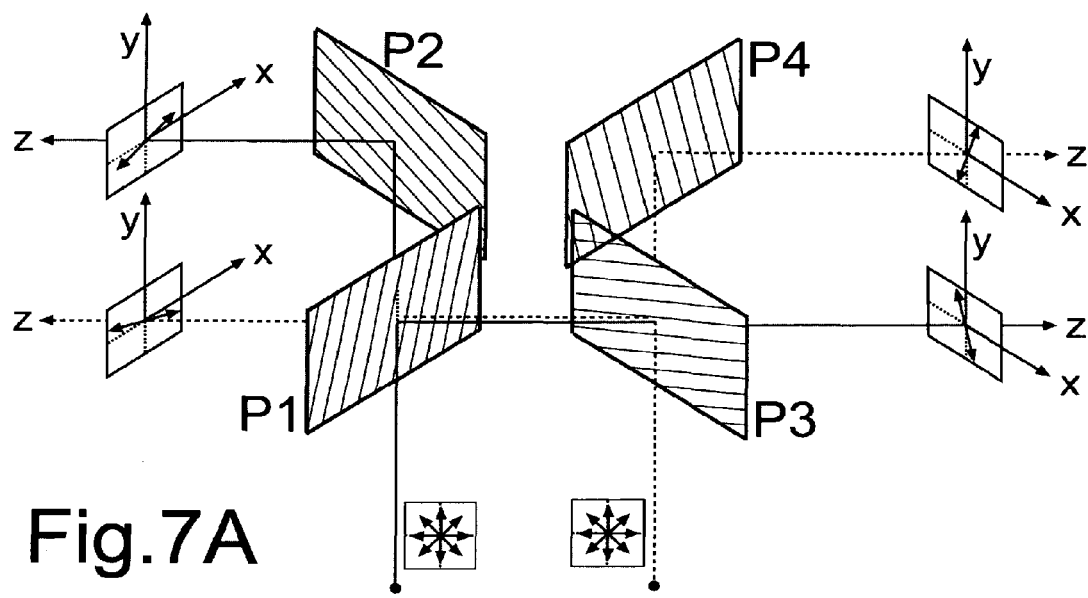
FIG. 7A schematically shows a third embodiment of the cross-polarizer.
Figure 7B:
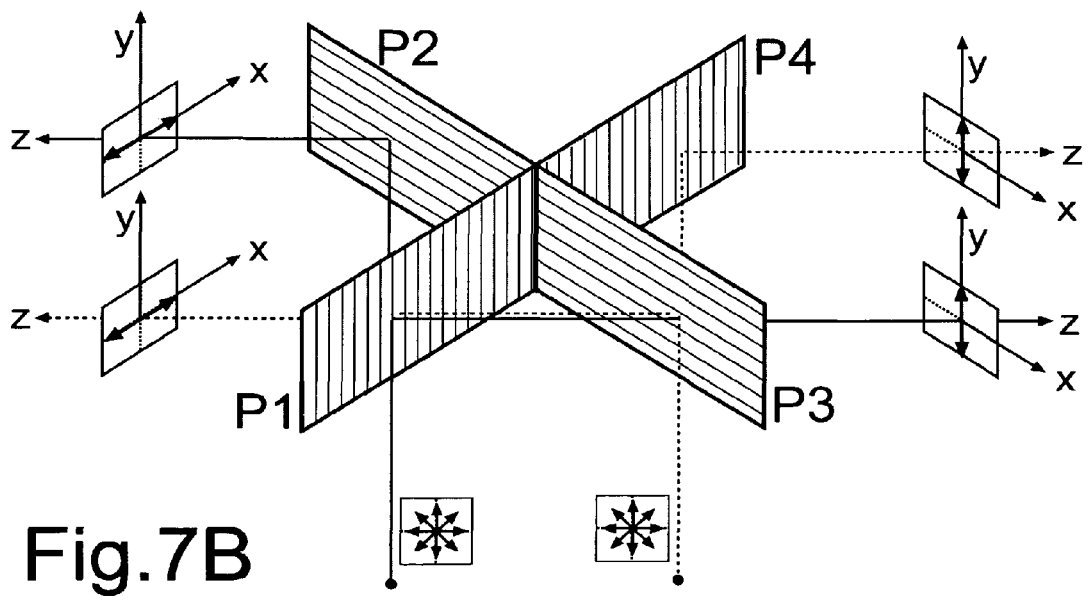
FIG. 7B schematically shows a fourth embodiment of the cross-polarizer.

FIG. 7 shows a four-armed cross-polarizer in a third and fourth embodiment of our invention in a planar arrangement. A fourth polarization layer (P4) expands the three-armed cross-polarizer from FIG. 5 to a four-armed cross. In this exemplary arrangement the polarization layers are perpendicular to each other and have their normal vectors coplanar to POI. This 4-armed cross-polarizer includes several 3-armed cross-polarizer functions. A first light path (solid line) couples P1 with the two polarizers P2 and P3, which are complementary to P1. A second light path (dotted line) couples P3 with the two polarizers P1 and P4, which are complementary to P3. The polarizing layer vectors in FIG. 7A (open form) are not aligned specifically to the POI. Thus the two light paths (incident light on P1 and P3) result in differently polarized light in both the west quadrant and east quadrant. In FIG. 7B (closed form) all four polarization layers meet in one axis. Using polarizing layer vectors parallel and perpendicular to the POI the two light paths (incident light on P1 an P3) result in equally polarized light in both the west quadrant (entire left side shown as "P"-polarized light) and the east quadrant (entire right side shown as "S"-polarized light).

Figure 8A:
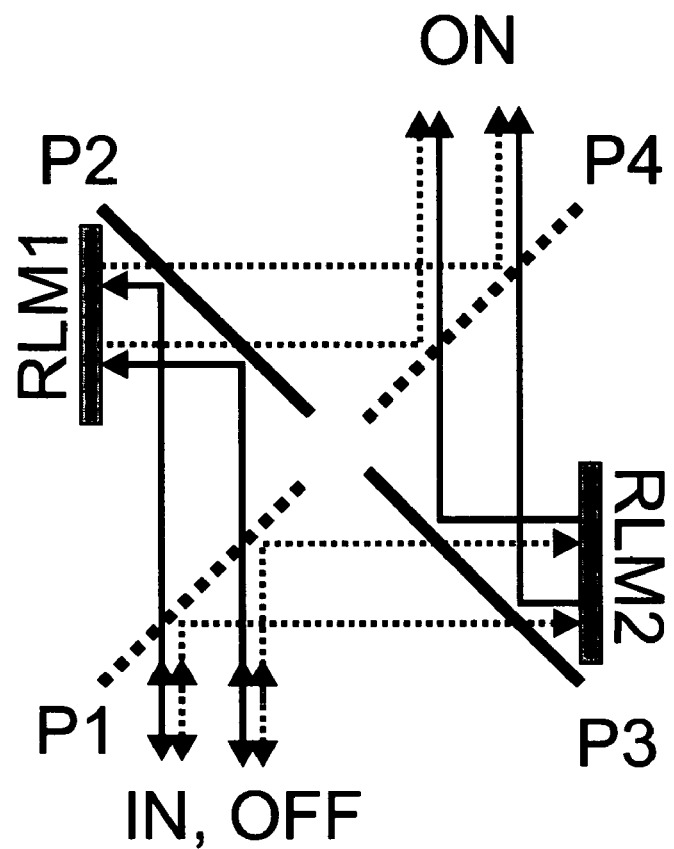
FIG. 8A schematically shows a fifth embodiment of the cross-polarizer.
Figure 8B:
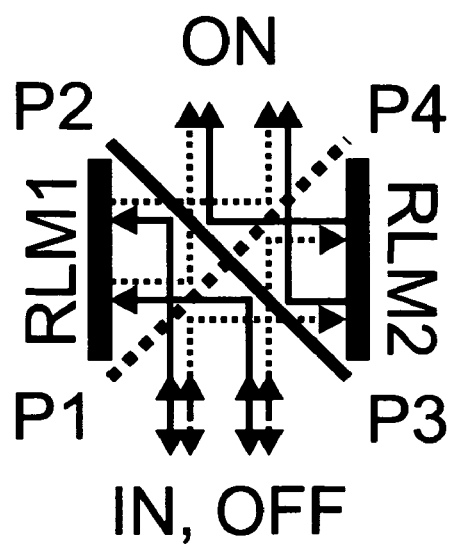
FIG. 8B schematically shows a sixth embodiment of the cross-polarizer (with spatial light modulators).

FIGS. 8A,B show a four-armed cross-polarizer in a fifth and sixth embodiment of our invention with two image modulators. Open form (FIG. 8A) and closed form (FIG. 8B) are directly combined with polarization rotating reflective spatial light modulators RLM. In the open form a cross-polarizer (P1,P2,P3) is used to direct incident light towards the two RLMs (IN, "P"-polarized light to RLM1 and "S"-polarized light to RLM2). Light beams incident on the RLM at dark pixels are not modulated, keep their polarization and thus are reflected back to the axis of incidence (OFF). Light beams incident on the RLM at bright pixels are rotated in their plane of polarization (ON); they are superposed in the left side of north quadrant by a second cross-polarizer (P4,P2,P3). The closed form (FIG. 8B) makes it possible to send light both to P1 and P3 using the entire south quadrant. According to FIG. 7B, this results for both input cross-polarizers (P1,P2,P3) and (P3,P1,P4) in "P"-polarized light in the entire east quadrant and "S"-polarized light in the entire west quadrant. Two further cross-polarizers (P2,P1,P4) and (P4,P3,P2) are used for superposition. A1 together, for the input into the RLMs and the output of the RLM-ON- and RLM-OFF-light four overlapping three-armed cross-polarizers are used. The closed form (FIG. 8B) uses less than 25% of the area needed for the open form (FIG. 8A).

Figure 9:
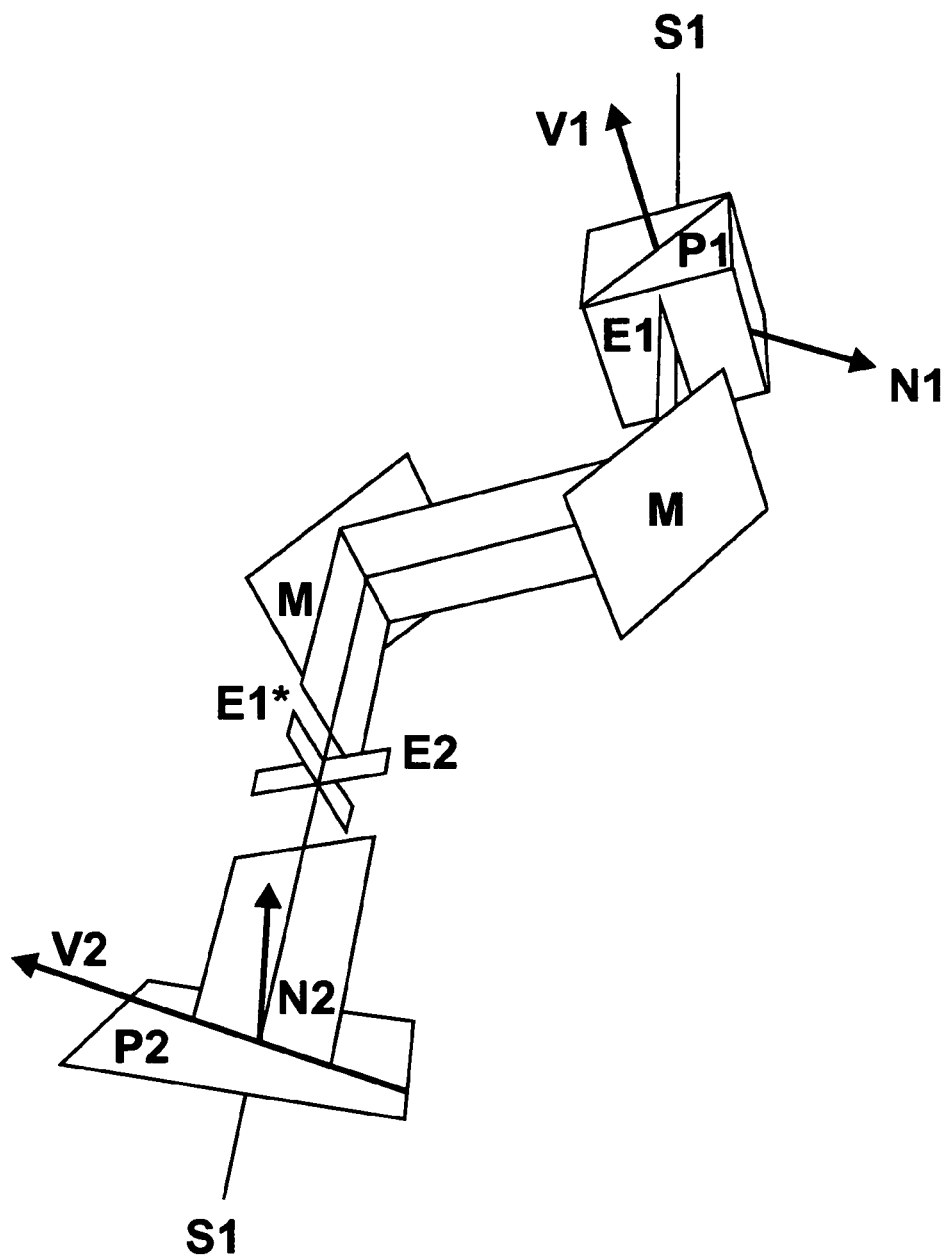
FIG. 9 shows optional foldings in the light path of the cross-polarizer.

FIG. 9 schematically shows optional foldings in the light path of the cross-polarizer. Two polarizers P1 and P2 can act complementary on a linearly polarized beam also if means for folding (M) are introduced in the path (S1) of this beam. Each folding M transforms both the axis of the beam and its POP. FIG. 9 shows a beam with a POP E1 (spanned by V1 and S1 at P1) which would be reflected by P1. Its POP E1 is transformed by each folding M to become E1*. Also, S1 is transformed by each folding. If the transformed S1 (at P2) and V2 span a plane E2, which is perpendicular to E1*, P2 will act complementary to P1, the beam with POP E1* will transmit P2. In contrast to many embodiments above, in FIG. 9 the normal vectors of the polarizing layer planes are not coplanar. In the shown example, P1 is a MacNeille PBS and P2 is a WGP.

Figure 10:
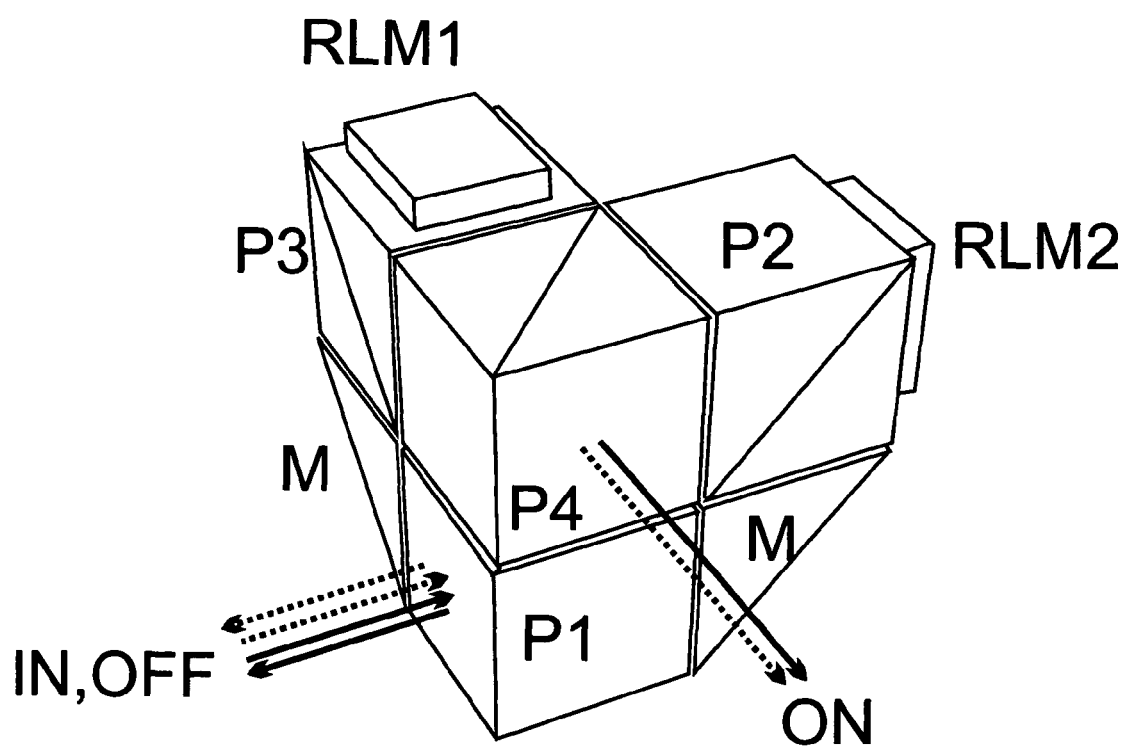
FIG. 10 schematically shows a seventh embodiment of the cross-polarizer (made of 4 MacNeille-PBSs).

FIG. 10 shows in a seventh embodiment of our invention a folded four-armed cross-polarizer using four MacNeille-type polarizers P1, P2, P3, P4 and two mirror planes (M; shown as total internal reflection prisms TIR) combined with polarization rotating reflective RLM1 and RLM2. The IN-beam and the OFF-beam use a cross-polarizer (P1,P3,P2) with additional means of reflection in each light path. For the superposition of the ON-beams we use a second cross-polarizer (P4, P3,P2) without additional reflection. This embodiment corresponds to the open form of the four-armed cross-polarizer.

Figure 11:
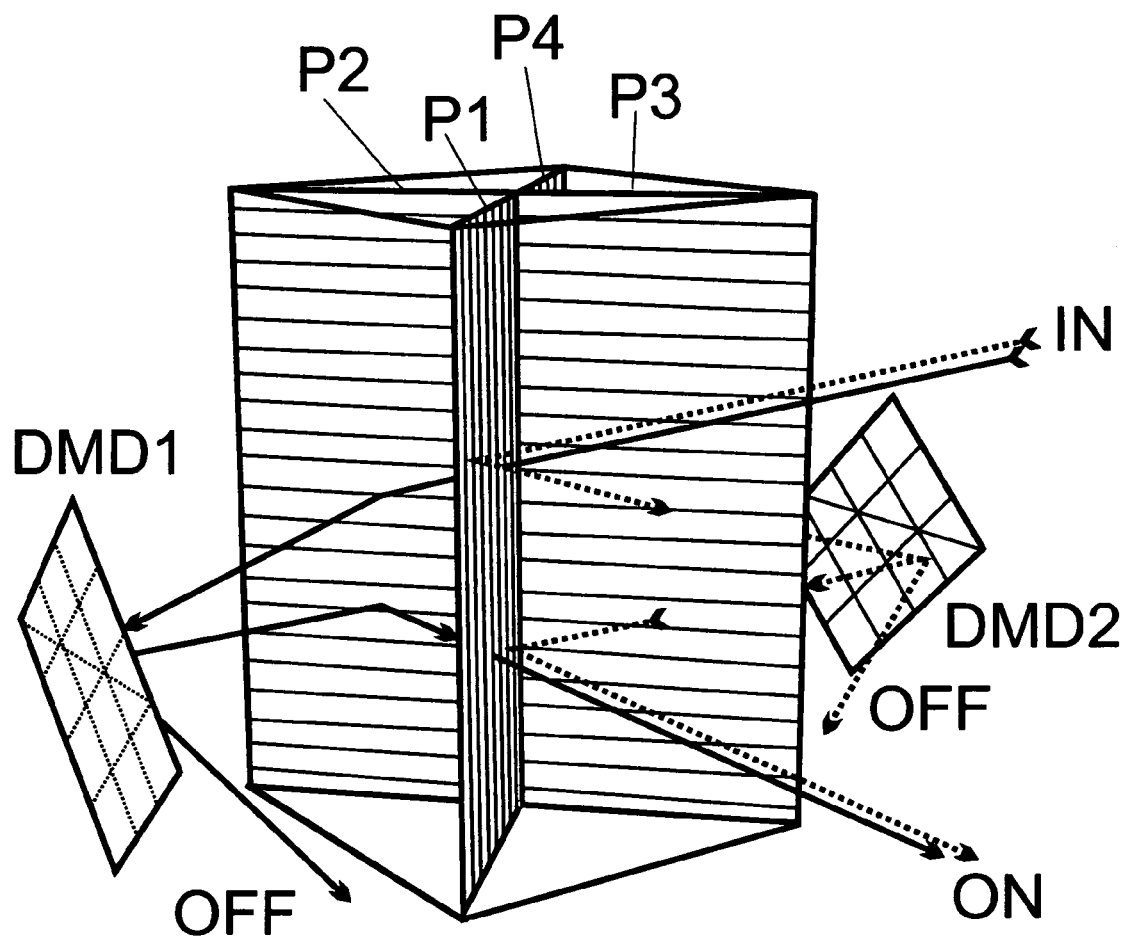
FIG. 11 schematically shows a eighth embodiment of the cross-polarizer (with MEMSs).

FIG. 11 shows in a eighth embodiment of our invention, a four-armed cross-polarizer in a closed form using reflective RLMs of the digital mirror device type (DMD). These DMDs modulate the incident light (IN) by directing ON- and OFF-light towards different directions without rotating their polarization. DMD1 and DMD2 show have identical topology (are the same stereoisomer). They reflect light at bright pixels normal the DMD surface. As there is no modulation dependent change of polarization, this ON-light of both DMDs is superposed and reflected back to the quadrant of incidence. Input POI and output POI have an intersection angle adjusted to the mirror deflection angle of the DMD. Light reflected from dark pixels (OFF) is directed towards a light dump (not shown).

Figure 12A:
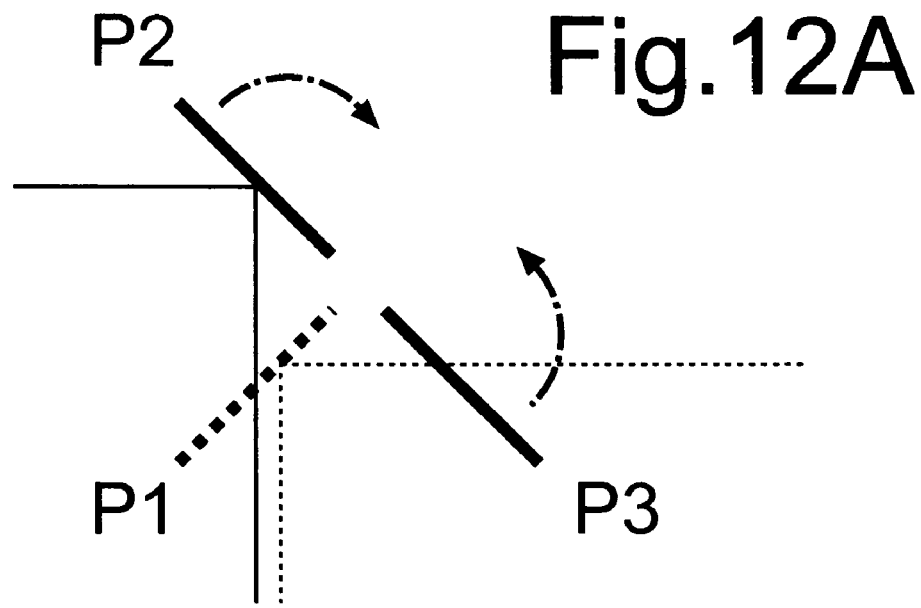
FIG. 12A shows the transformation from the second embodiment of the invention into the ninth embodiment shown in FIG. 12B.
Figure 12B:
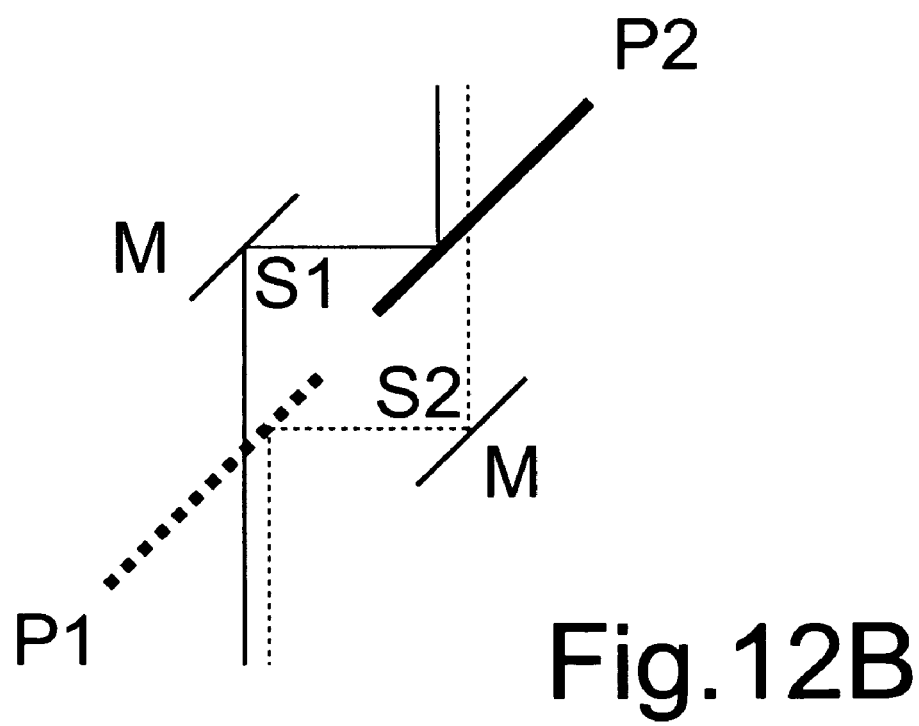
FIG. 12B schematically shows a ninth embodiment of the cross-polarizer.

FIGS. 12A,B show a two-armed form of the cross-polarizer (ninth embodiment of our invention). The three-armed cross-polarizer of FIG. 5B can be converted to a two-armed cross-polarizer by fusion of P2 and P3 and additional folding (M) of each sub-beam (FIG. 12B). Both sub-beams created at P1 ("P"-polarized sub-beam in light path S1 by polarizing transmission of the input beam at P1 and "S"-polarized sub-beam in light path S2 by polarizing reflection of the input beam at P1) are folded toward a second polarizer P2 such that the "S"-polarized sub-beam transmits P2 and the "P"-polarized sub-beam is reflected at P2. P2 thus acts complementary to P1 for both sub-beams. FIG. 12A shows that P2 in FIG. 12B can be understood as a fusion of P2 and P3 in the second embodiment (FIG. 5B). As both sub-beams in S1 and S2 are separated only between the two polarizers, this embodiment can be used in 2-channel display systems with spatial light modulators e.g. of the MEMS type which are placed in S1 and S2 between P1 and P2.

Figure 13A:
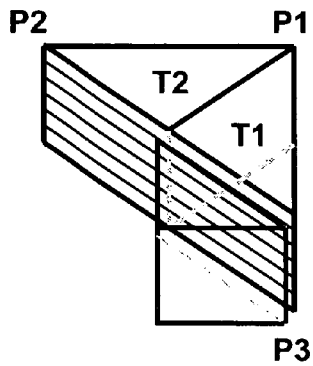
FIG. 13A shows a compound triangular glass prism carrying an inside thin-film polarizing layer and and outside cartesian polarizing layer.
Figure 13B:
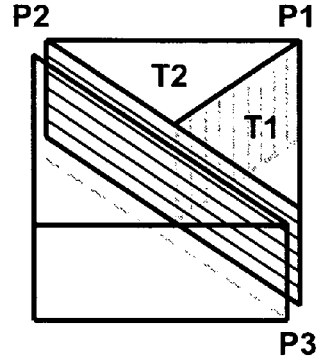
FIG. 13B shows a compound triangular glass prism carrying an inside cartesian polarizing layer and and outside cartesian polarizing layer.
Figure 13C:
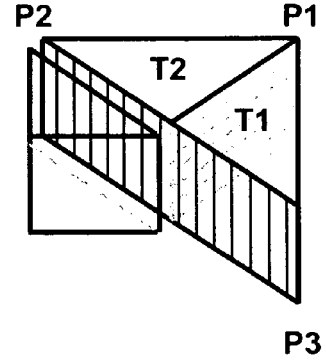
FIG. 13C shows a similar arrangement as FIG. 13B with swapped polarizing vectors.
Figure 13D:
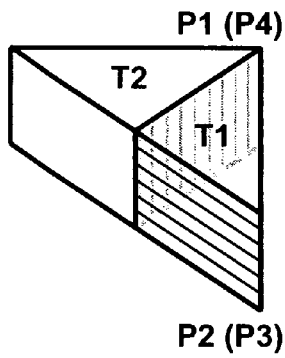
FIG. 13D shows two glass prisms, each of which carries one cartesian polarizing layer.
Figure 13E:
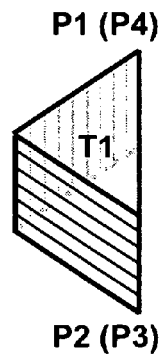
FIG. 13E shows a single glass prism, which carries two cartesian polarizing layers with different polarizing vectors.
Figure 13F:
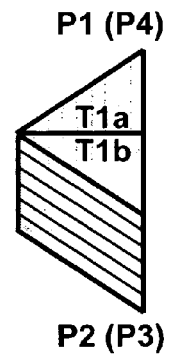
FIG. 13F shows two glass prisms, each of which carries one cartesian polarizing layer.
Figure 13G:
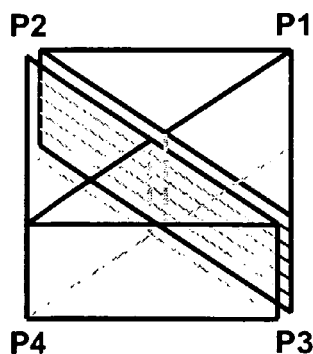
FIG. 13G shows a four-armed cross-polarizer made of two compound glass prisms.
Figure 13H:
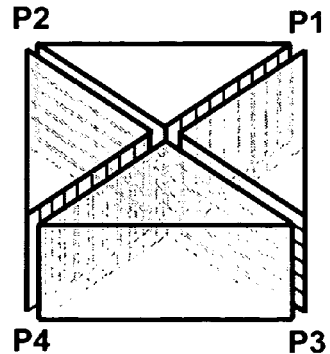
FIG. 13H shows a four-armed cross-polarizer made of four glass prisms.
Figure 13I:
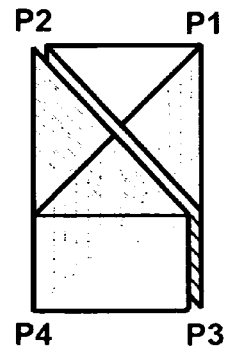
FIG. 13I shows a four-armed cross-polarizer made of differently shaped glass prisms.

FIGS. 13A-I show glass prisms with polarizing layers which are configured to built cross-polarizers. FIG. 13A shows a cross-polarizer made of a right triangular prism, which comprises two right sub-prisms T1 and T2. Between T1 and T2 there is a polarizing layer P1 of the MacNeille type. The continuous surface of the prism which consists of two surfaces of the two sub-prisms carries a cartesian polarization layer P2/P3 with a polarizing layer vector V2 parallel to the base of the prism. Further glass prisms without polarizing layer may be added to the arrangement (see FIG. 13A-C) to complete a three-armed cross-polarizer. In FIG. 13B P1 is a cartesian polarization layer. FIG. 13C shows a similar arrangement as FIG. 13B but with swapped polarizing vectors. FIG. 13D-F show prism arrangements with cartesian polarizing layers with which cross-polarizers (three- or four-armed) can be built. Two prisms of the types shown in FIG. 13D-F suffice to build a four-armed cross-polarizer. Four prisms of the one shown in FIG. 13E-F result in a four-armed cross-polarizer which has double polarizing layers (FIG. 13H). In FIG. 13F the polarization layers are mounted to a lateral surface of sub-prisms T1a and T1b. In FIG. 13G a four-armed cross-polarizer is constructed by adding a triangular MacNeille type polarizer to the three-armed cross-polarizer shown in FIG. 13A. FIG. 13I shows an example of a four-armed cross-polarizer in which the polarizing layers are not perpendicular to each other.

Figure 14A:
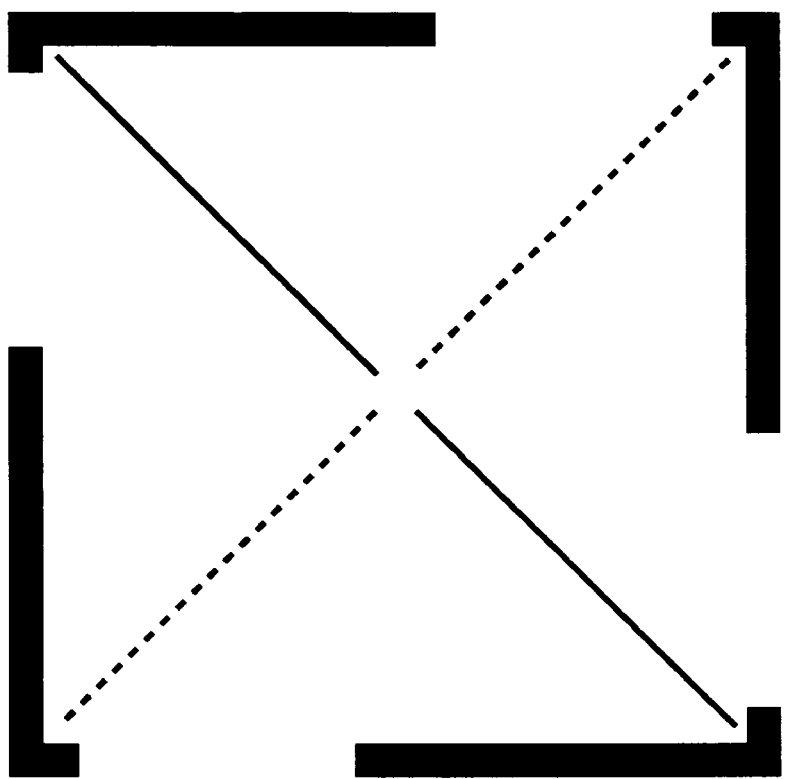
FIG. 14A shows a four-armed cross-polarizer (open form) within a body.
Figure 14B:
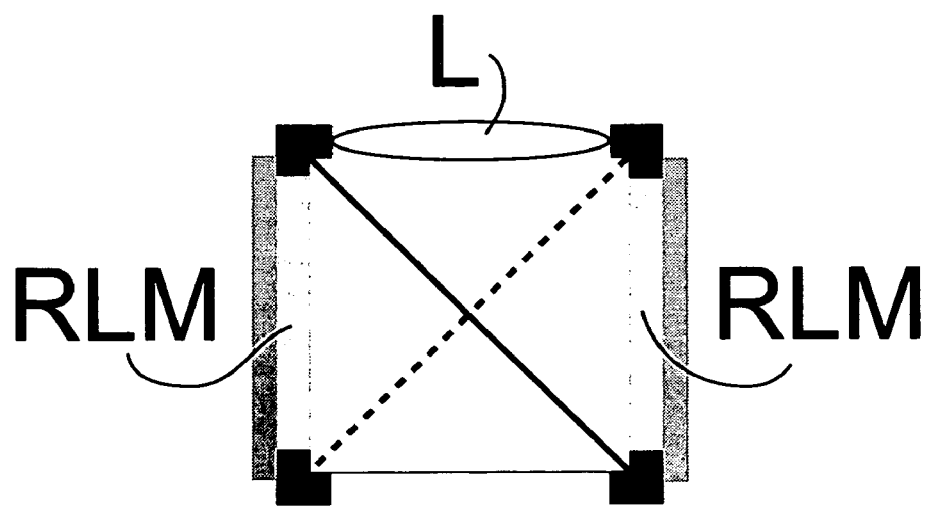
FIG. 14B shows a four-armed cross-polarizer (closed form) within a body.

FIG. 14 shows cross-polarizers within a closed body. FIG. 14A shows the open form, FIG. 14B the closed form of the four-armed cross-polarizer each contained in a single body. Openings can be used to directly mount RLMs (FIG. 14B). It is also possible to integrate optical elements as projection lenses L to the body of the cross-polarizer.

It will be appreciated that whilst this invention is described by way of detailed embodiments, these realizations serve as illustrations of the invention but not as a limitation of the invention; numerous variations in form and detail can be deduced by those skilled in the art or science to which this invention pertains without leaving the scope of the invention as defined by the following claims:

The invention claimed is:

1. Complex polarizer system,
comprising an arrangement of at least three polarizing beam splitting layers Pi, wherein i=1, 2, 3 or 4;
each Pi being characterized by its polarizing layer vector Vi, whereas Vi equals the direction vector of the intersection line of Pi and the plane of polarization of any light beam reflected by Pi without additional polarization rotating components;
a first polarizing beam splitting layer (P1) being configured to split an unpolarized light beam propagating along a first axis (A1) into a transmitted linearly polarized light beam transmitted by first polarizing beam splitting layer (P1), and a reflected linearly polarized light beam reflected by first polarizing beam splitting layer (P1) along a second axis (A2);
a second polarizing beam splitting layer (P2) being arranged along the first axis (A1) such that
the first axis (A1) and the second polarizing layer vector (V2) span a plane which is normal to the plane spanned by the first axis (A1) and the first polarizing layer vector (V1),
the second polarizing beam splitting layer (P2) and the first polarizing beam splitting layer (P1) therefore being configured as a polarizing beam splitting system,
wherein the transmitted linearly polarized beam which was transmitted by the first polarizing beam splitting layer (P1) along the first axis (A1) is reflected at the second polarizing beam splitting layer (P2) without interjacent polarization rotating components, wave plates or active rotators, between the first and the second polarizing beam splitting layers (P1, P2);
a third polarizing beam splitting layer (P3) being arranged along the second axis (A2) such that
the second axis (A2) and the third polarizing layer vector (V3) span a plane which is normal to the plane spanned by the second axis (A2) and the first polarizing layer vector (V1),
the third polarizing beam splitting layer (P3) and the first polarizing beam splitting layer (P1) therefore being configured as a polarizing beam splitting system
wherein the reflected linearly polarized beam reflected by the first polarizing beam splitting layer (P1) into the second axis (A2) is transmitted at the third polarizing beam splitting layer (P3) without interjacent polarization rotating components, wave plates or active rotators, between the first and the third polarizing beam splitting layers (P1, P3).

2. Complex polarizer system according to claim 1, each Pi being a cartesian polarizer, and their normal vectors being coplanar.

3. Complex polarizer system according to claim 2, said first polarizing layer vector (V1) being perpendicular to said second polarizing layer vector (V2).

4. Complex polarizer system according to claim 3, said second and said third polarizing beam splitting layers (P2, P3) being part of a common polarizing beam splitting layer with a common polarizing layer vector.

5. Complex polarizer system according to claim 1, comprising
at least one composed prism with a triangular base comprising a first and a second right sub-prisms (T1, T2) each with an isosceles triangular base;
the lateral surface of the second sub-prism (T2), which faces the first sub-prism (T1) carrying a cartesian polarization layer;
the lateral surface of the first sub-prism (T1), which together with a lateral surface of the second sub-prism (T2) forms a common lateral surface of said composed prism, carrying a cartesian polarization layer.

6. Complex polarizer system according to claim 1, comprising
a right prism with an isosceles triangular base;
both lateral surfaces of equal size of said prism carrying a polarization layer.

7. Complex polarizer system according to claim 1, comprising a fourth polarizing beam splitting layer (P4) which together with said second polarizing beam splitting layer (P2) and said third polarizing beam splitting layer (P3) constitutes an additional complex polarizer system according to claim 1.

8. Complex polarizer system according to claim 7, said first polarizing beam splitting layer (P1) and said fourth polarizing beam splitting layer (P4) being coplanar and having a common layer vector, and said second polarizing beam splitting layer (P2) and said third polarizing beam splitting layer (P3) being coplanar and having a common layer vector.

9. Complex polarizer system according to claim 8, said first and fourth polarizing beam splitting layers (P1, P4) being polarizing beam splitting layers of the thin-film type;
said second and third polarizing beam splitting layers (P2, P3) being polarizing beam splitting layers of the cartesian type.

10. Complex polarizer system according to claim 1, said Pi being cartesian polarizers.

11. Complex polarizer system according to claim 1, said Pi being thin-film polarizers of the MacNeille type.

12. Complex polarizer system according to claim 1, said polarizing beam splitting layers Pi being contained in a body with windows or openings.

13. Complex polarizer system according to claim 1, further comprising at least one spatial light modulator which is mounted to the body.

14. Complex polarizer system according to claim 1, further comprising
at least two spatial light modulators;
said complex polarizer system being used to feed the spatial light modulators with polarized light.

15. Complex polarizer system according to claim 1, further comprising
at least two spatial light modulators;
said complex polarizer system being used to superpose the modulated light from the spatial light modulators.

16. Complex polarizer system according to claim 1, further comprising
at least two spatial light modulators of the type micro-electro-mechanical-system (MEMS);

said complex polarizer system being used to feed the spatial light modulators with polarized light and to superpose the modulated light from the spatial light modulators.

17. Complex polarizer system according to claim 1, comprising at least one right triangular prism;
    said prism being a compound prism composed of two right triangular sub-prisms with the base of an isosceles triangle each, with said first polarizing beam splitting layer (P1) being a thin-film type polarizing beam splitting layer which is situated between these two sub-prisms;
    the lateral surface of the compound prism which consists of two lateral surfaces of the sub-prisms carrying said second polarizing beam splitting layer (P2) which is a cartesian type polarizing beam splitting layer;
    said second polarizing layer vector (V2) being perpendicular to said first polarizing layer vector (V1).

18. Complex polarizer system according to claim 1, comprising at least one right triangular prism;
    said prism being a compound prism composed of two right triangular sub-prisms with the base of an isosceles triangle each, with said first polarizing beam splitting layer (P1) being a cartesian type polarizing beam splitting layer which is situated between these two sub-prisms;
    the lateral surface of the compound prism which consists of two lateral surfaces of the sub-prisms carrying said second polarizing beam splitting layer (P2) which is a cartesian type polarizing beam splitting layer.

19. Complex polarizer system according to claim 1, comprising at least one right triangular prism;
    this prism being a compound prism composed of two right triangular sub-prisms (T1a, T1b) with the base of an isosceles triangle each;
    those lateral surfaces of the compound prism which consist of only one lateral surface of the sub-prisms carrying said first and second polarizing beam splitting layers (P1, P2).

20. Complex polarizer system according to claim 1, comprising at least one right triangular prism;
    said prism being composed of two right sub-prisms with the base of an isosceles triangle each;
    said first polarizing beam splitting layer (P1) being a thin-film type polarizing beam splitting layer which is situated between these two sub-prisms.

21. Method of complex polarization,
    using a complex polarizer system according to claim 1 to split a beam into two linearly polarized sub-beams.

22. Complex polarizer system according to claim 1,
    comprising at least one right triangular prism;
    at least one lateral surface of said prism carrying a polarizing beam splitting layer Pi.

23. Complex polarizer system according to claim 22,
    two lateral surfaces of said prism carrying polarizing beam splitting layers.

24. Complex polarizer system according to claim 1, all of said Pi being wire grid polarizers.

* * * * *